US007814091B2

(12) United States Patent
Ghosh et al.

(10) Patent No.: US 7,814,091 B2
(45) Date of Patent: *Oct. 12, 2010

(54) MULTI-TIERED QUERY PROCESSING TECHNIQUES FOR MINUS AND INTERSECT OPERATORS

(75) Inventors: Bhaskar Ghosh, Burlingame, CA (US); Rafi Ahmed, Fremont, CA (US); Hermann Baer, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 402 days.

This patent is subject to a terminal disclaimer.

(21) Appl. No.: 11/237,040

(22) Filed: Sep. 27, 2005

(65) Prior Publication Data

US 2007/0073643 A1    Mar. 29, 2007

(51) Int. Cl.
*G06F 7/00* (2006.01)
*G06F 17/30* (2006.01)
(52) U.S. Cl. .................. 707/713; 707/718; 707/719
(58) Field of Classification Search .................. 707/3, 707/705, 711–719, 999.1, 999.3–999.6
See application file for complete search history.

(56) References Cited

U.S. PATENT DOCUMENTS

| 5,412,804 A | | 5/1995 | Krishna |
| 5,437,032 A | | 7/1995 | Wolf et al. |
| 5,495,605 A | | 2/1996 | Cadot |
| 5,548,755 A | | 8/1996 | Leung et al. |
| 5,588,150 A | | 12/1996 | Lin et al. |
| 5,590,319 A | | 12/1996 | Cohen et al. |
| 5,590,324 A | * | 12/1996 | Leung et al. ............... 707/5 |
| 5,724,570 A | | 3/1998 | Zeller et al. |
| 5,797,136 A | | 8/1998 | Boyer et al. |
| 5,822,748 A | | 10/1998 | Cohen et al. |
| 5,832,477 A | * | 11/1998 | Bhargava et al. .......... 707/2 |
| 5,905,981 A | * | 5/1999 | Lawler ...................... 707/4 |

(Continued)

OTHER PUBLICATIONS

Kemp et al. "Improving Federated Database Queries Using Declarative Rewrite Rules for Quantified Subqueries", Journal of Intelligent Information Systems, Dec. 2001. vol. 17,Iss.2-3;p. 281. Download: http://proquest.umi.com/pqdlink?Ver=1&Exp=04-11-2015 &FMT=7&DID=352547461&RQT=309&cfc=1.*

(Continued)

*Primary Examiner*—John E Breene
*Assistant Examiner*—Hares Jami
(74) *Attorney, Agent, or Firm*—Hickman Palermo Truong & Becker LLP; Brian D. Hickman

(57) ABSTRACT

Various techniques are described for processing database commands that include MINUS and/or INTERSECT operators. The queries containing the MINUS and/or INTERSECT operators are transformed to create a plurality of transformed queries. Each of the transformed queries produces the same result as the original query, but does not include the MINUS and/or INTERSECT operator. To achieve the same result set as the original query, the transformed queries employ equijoins, antijoins, and/or semijoins, and duplicate elimination operations. Costs are estimated for each of the various transformed queries. Based on the cost estimates, one of the transformed queries is selected as the query that is to be executed to perform the operations specified in the original query.

30 Claims, 2 Drawing Sheets

U.S. PATENT DOCUMENTS

| | | | |
|---|---|---|---|
| 5,924,088 | A | 7/1999 | Jakobsson et al. |
| 5,963,932 | A * | 10/1999 | Jakobsson et al. ............... 707/2 |
| 5,963,959 | A | 10/1999 | Sun et al. |
| 5,974,408 | A | 10/1999 | Cohen et al. |
| 6,026,394 | A | 2/2000 | Tsuchida et al. |
| 6,032,143 | A | 2/2000 | Leung et al. |
| 6,061,676 | A | 5/2000 | Srivastava et al. |
| 6,289,334 | B1 * | 9/2001 | Reiner et al. .................... 707/3 |
| 6,298,342 | B1 | 10/2001 | Graefe et al. |
| 6,339,768 | B1 | 1/2002 | Leung et al. |
| 6,370,524 | B1 | 4/2002 | Witkowski |
| 6,510,422 | B1 | 1/2003 | Galindo-Legaria et al. |
| 6,529,896 | B1 | 3/2003 | Leung et al. |
| 6,529,901 | B1 | 3/2003 | Chaudhuri et al. |
| 6,535,874 | B2 | 3/2003 | Purcell |
| 6,622,138 | B1 | 9/2003 | Bellamkonda et al. |
| 6,694,306 | B1 | 2/2004 | Nishizawa et al. |
| 6,792,420 | B2 | 9/2004 | Stephen Chen et al. |
| 6,801,905 | B2 | 10/2004 | Andrei |
| 6,934,699 | B1 | 8/2005 | Haas et al. |
| 7,031,956 | B1 | 4/2006 | Lee et al. |
| 7,089,225 | B2 | 8/2006 | Li et al. |
| 7,111,020 | B1 | 9/2006 | Gupta et al. |
| 7,146,360 | B2 | 12/2006 | Allen et al. |
| 7,158,994 | B1 | 1/2007 | Smith et al. |
| 7,167,852 | B1 | 1/2007 | Ahmed et al. |
| 7,246,108 | B2 | 7/2007 | Ahmed |
| 7,440,935 | B2 | 10/2008 | Day et al. |
| 2001/0047372 | A1 | 11/2001 | Gorelik et al. |
| 2003/0055814 | A1 | 3/2003 | Chen et al. |
| 2003/0120825 | A1 | 6/2003 | Avvari et al. |
| 2004/0148278 | A1 | 7/2004 | Milo et al. |
| 2004/0167904 | A1 | 8/2004 | Wen et al. |
| 2004/0220911 | A1 | 11/2004 | Zuzarte et al. |
| 2004/0220923 | A1 | 11/2004 | Nica |
| 2004/0267760 | A1 | 12/2004 | Brundage et al. |
| 2005/0033730 | A1 | 2/2005 | Chaudhuri et al. |
| 2005/0055382 | A1 | 3/2005 | Ferrat et al. |
| 2005/0076018 | A1 | 4/2005 | Neidecker-Lutz |
| 2005/0149584 | A1 | 7/2005 | Bourbonnais et al. |
| 2005/0187917 | A1 | 8/2005 | Lawande et al. |
| 2005/0198013 | A1 * | 9/2005 | Cunningham et al. ........... 707/3 |
| 2005/0210010 | A1 * | 9/2005 | Larson et al. ................... 707/3 |
| 2005/0234965 | A1 | 10/2005 | Rozenshtein et al. |
| 2005/0283471 | A1 | 12/2005 | Ahmed |
| 2005/0289125 | A1 | 12/2005 | Liu et al. |
| 2006/0167865 | A1 * | 7/2006 | Andrei ........................... 707/4 |
| 2007/0027880 | A1 | 2/2007 | Dettinger et al. |
| 2007/0073643 | A1 | 3/2007 | Ghosh et al. |

OTHER PUBLICATIONS

Mistry et al, "Materialized View Selection and Maintenance Using Multi-Query Optimization," IIT-Bombay Bell Labs Univ. of Massachusetts-Amherst (Jun. 2001).
Chaudhuri, Surajit et al., "Including Group-By in Query Optimization," Proceedings of the 20$^{th}$ VLDB Conference—1994, pp. 354-366.
Galindo-Legaria, Cesar et al., "Outerjoin Simplification and Reordering for Query Optimization," ACM Transactions on Database Systems, vol. 22, No. 1, Mar. 1997, pp. 43-74.
Erickson, Gail et al., "Improving Performance with SQL Server 2000 Indexed Views," Microsoft TechNet, Sep. 2000, located on the internet at http://www.microsoft.com/technet/prodtechnol/sql/2000/maintain/indexvw.mspx?pf=true, retrieved on Nov. 11, 2006, 14 pages.
Mishra, Priti et al., "Join Processing in Relational Databases," ACM Computing Surveys, vol. 24, No. 1, Mar. 1992, pp. 63-113.
Muralikrishna, M. "Improved Unnesting Algorithms for Join Aggregate SQL Queries,", Proceedings of the 18$^{th}$ VLDB Conference—1992, pp. 91-102.
Seshadri, Preveen, "Cost-Based Optimization for Magic: Algebra and Implementation," SIGMOND '96, 1996 ACM 0-89791-794-4, pp. 435-446.
Deutsch, Alin et al., "Minimization and Group-By Detection for Nested XQueries", University of California, San Diego, 2003, 15 pages.
Dehaan, David, "A Rewriting Algorithm for Multi-Block Aggregation Queries and Views using Prerequisites and Compensations", University of Waterloo, Canada, Technical Report CS-2004-25, May 3, 2004, 39 pages.
Chaudhuri, Surajit, "An Overview of Query Optimization in Relational Systems", Microsoft Research, 1998, 10 pages.
Muralikrishna, M., "Improved Unnesting Algorithms for Join Aggregate SQL Queries", VLDB Conference, Canada, 1992, 12 pages.
Hayu, John, "Analytic SQL Features in Oracle9i", An Oracle Technical White Paper, Dec. 2001, 32 pages.
Oracle, "Optimizer Modes, Plans Stability, and Hints", Oracle8i Tuning Release 8.1.5 A67775-01, Oracle Website, 1999, 54 pages.
Ahmed, Rafi et al., "Cost-based Query Transformation in Oracle," VLDB 2006, Seoul, Korea, Copyright 2006 VLSB Endowment, ACM 1-59593-385, pp. 1026-1036.
George Lumpkin, Hakan Jakobsson, "Query Optimization in Oracle9$i$," Oracle Corporation, Oracle White Paper, Feb. 2002, pp. 1-30.
Hamid Pirahesh, Joseph M. Hellerstein, Waqar Hasan, "Extensible/Rule Base Query Rewrite Optimization in Starburst," IBM Almaden Research Center, pp. 1-10.
Umeshwar Dayal, "Of Nests and Trees: A Unified Approach to Processing Queries That Contain Nest Subqueries, Aggregates and Quantifiers," Proceedings of the 13$^{th}$ VLDB Conference, Brighton 1987, pp. 197-208.
P. Griffiths Selinger, M.M. Astrahan, D.D. Chamberlin, R.A. Lorie, T.G. Price, "Access Path Selection in a Relational Database Management System," Proceedings of the 1979 ACM SIGMOD International Conference on the Management of Data, 1979, pp. 23-34.
Chen, et al., "View Merging in the Context of View Selection Changing," Database Engineering and Applications Symposium 2002, Proceedings, Jul. 2002, 10 pages.
Priti, Patil et al., "Holistic Schema Mappings for XML-on-RDBMS," Database systems for advanced applications, vol. 3882, Lecture notes in Computer Science, Springer-Verlag, Jan. 1, 2006, 16 pages.
Hammerschmidt, B C et al., "Autonomous Index Optimization in XML Databases," 21$^{st}$ International Conference on Data Engineering, XP010924124, IEEE, Apr. 5, 2005, 10 pages.
European Patent Office, "International Search Report," PCT/US2008/052932, dated Jun. 13, 2008, 13 pages.
Claims, PCT/US2008/052932, 4 pages.
Oracle, "Oracle® Enterprise Manager," Part A96673-02, Oct. 2002, Chapters 1-4, 439 pages.
Oracle, "Oracle® Enterprise Manager," Part A96673-02, Oct. 2002, Chapters 5-Appendix H, 394 pages.
Fitzgerald et al., "Special Edition Using Crystal Reports IO," Que, Chapters 23, 24, 27, 35, Appendix A, Jul. 14, 2004, 170 pages.
Rankins et al., "Microsoft SQL Server 2000 Unleashed," Second Edition, Sams, Chapters 3, 4, 5, 6, 36, Dec. 18, 2002, 109 pages.

* cited by examiner

MULTI-TIERED QUERY PROCESSING TECHNIQUES FOR MINUS AND INTERSECT OPERATORS

RELATED APPLICATIONS

The present application is related to U.S. patent application Ser. No. 10/874,400, entitled "Multi-Tier Query Procesing" filed by Rafi Ahmed on Jun. 22, 2004, the content of which is incorporated herein by reference.

The present application is also related to U.S. patent application Ser. No. 11/237,039, entitled "PARALLEL QUERY PROCESSING TECHNIQUES FOR MINUS AND INTERSECT OPERATORS", filed by Bhaskar Ghosh, Rafi Ahmed, Hermann Baer on Sep. 27, 2005, the content of which is incorporated herein by reference.

FIELD OF THE INVENTION

The present invention relates to databases and, more specifically, to query processing techniques for queries that contain MINUS and INTERSECT operators.

BACKGROUND

A join is a query that combines rows from two or more sources, such as tables, views, or snapshots. In the context of database systems, a join is performed whenever multiple tables appear in a query's FROM clause. The query's select list can select any columns from any of the base tables listed in the FROM clause.

An equijoin is a join with a join condition containing an equality operator. An equijoin combines rows that have equivalent values for the specified columns. Query1 is an equijoin that combines the rows of tables R and S where the value in column r.b is the same as the value in column s.b:

| QUERY1 |
| --- |
| SELECT *<br>FROM R, S<br>WHERE r.b = s.b; |

For the purpose of illustration, assume that tables R and S contain the following rows:

TABLE R

| a | B |
| --- | --- |
| W | A |
| X | A |
| Y | B |
| Z | C |

TABLE S

| a | B |
| --- | --- |
| 1 | A |
| 2 | C |
| 3 | C |
| 4 | D |

Under these circumstances, Query 1 would produce the result set:

| R.a | R.b | S.a | S.b |
| --- | --- | --- | --- |
| W | A | 1 | A |
| X | A | 1 | A |
| Z | C | 2 | C |
| Z | C | 3 | C |

In this example, two rows ((W, A) and (X, A)) in table R combine with row (1, A) in row S. Therefore, row (1, A) appears twice in the result set. Similarly, row (Z, C) in table R combines with two rows ((2, C) and (3, C)) in table S. Therefore, row (Z, C) appears twice in the result set. Row (Y, B) of table R does not combine with any row in table S, so row (Y, B) is not reflected in the result set of the equijoin. Similarly, row (4, D) of table S did not combine with any row in table R, so row (4, D) is not reflected in the result set of the equijoin.

An equijoin is an example of a binary operation that produces a result multi-set (a multi-set is a collection of items that allows non-distinct items) based on the contents of two multi-set sources. Other binary SQL operations that produce result set based on two multi-set sources are minus and intersect. Each of these operations shall be described in greater detail hereafter.

Minus

A minus operation returns all of the distinct elements of one multi-set (the "left-hand source") that do not match any values in another multi-set (the "right hand source"). Thus, column R.b minus column S.b would produce the result set (B), because B is the only value in R.b that does not match with any value in S.b. Significantly, even if R.b has the value "B" in several rows, the result set of the minus operation would only include a single "B", because minus operations only return distinct values (i.e. no duplicates).

Intersect

An intersect operation returns all of the distinct elements in one multi-set (the "left-hand source") that are also contained in another multi-set (the "right-hand source"). Thus, column R.b intersect column S.b would produce the result set (A, C), because A and C are the values in R.b that match values in S.b. Significantly, even though C matches two rows in S.b, only one C is included in the result set because intersect operations only return distinct values.

Minus and Intersect Operations

MINUS and INTERSECT are commonly used set operators in the Structured Query Language ("SQL") that is supported by most database servers. MINUS and INTERSECT operators have been adopted in ANSI SQL for the last ten years, and every major database vendor offers support of the MINUS and INTERSECT operators in some form or another. A common strategy for performing the MINUS/INTERSECT operations involves, for example, performing a sort-merge join and a sort-merge anti-join, respectively.

In data-warehouses with reporting applications, set operators are usually evaluated on very large sets of data, so it is critical to make the set operations, such as MINUS and INTERSECT, scale in any SQL execution engine. Based on the foregoing, it is desirable to provide techniques that handle MINUS/INTERSECT operations more efficiently.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Various techniques are described hereafter for processing database commands that include MINUS and/or INTERSECT operators. According to one approach, multi-tiered transformation is performed on queries that contain MINUS and/or INTERSECT operators to create a plurality of transformed queries. Each of the transformed queries produces the same result as the original query, but does not include the MINUS and/or INTERSECT operator. Queries that produce the same result as a particular query are referred to herein as "equivalent queries" or "semantically equivalent queries" of that particular query.

To achieve the same result set as the original query, the transformed queries employ equijoins, antijoins, and/or semi-joins, and duplicate elimination operations. Costs are estimated for each of the various transformed queries. Based on the cost estimates, one of the transformed queries is selected as the query that is to be executed to perform the operations specified in the original query.

Figure 1:
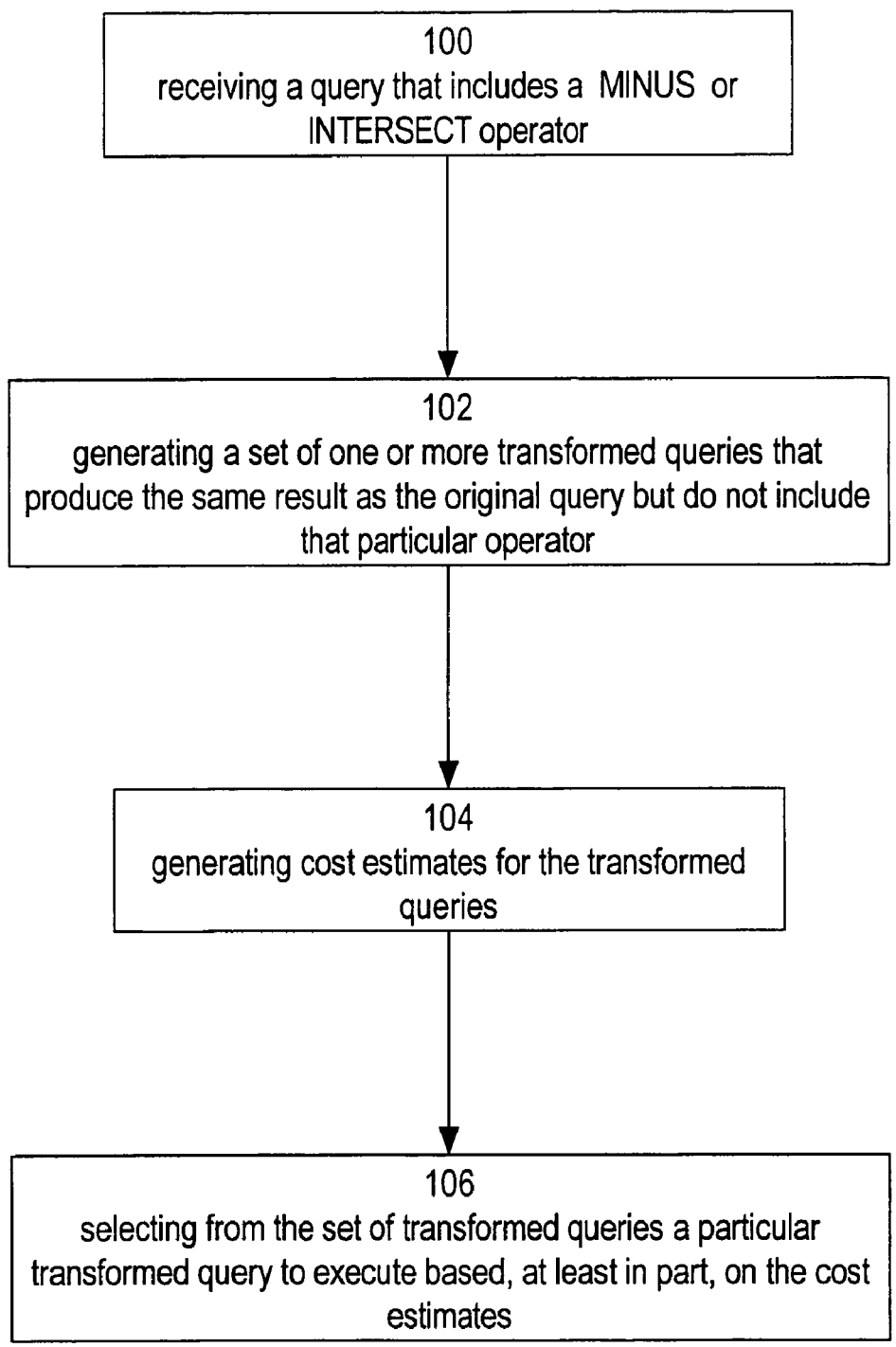
FIG. 1 is a flowchart that shows the general steps for handling queries that contain MINUS and/or INTERSECT operators, according to one embodiment.

FIG. 1 is a flowchart that shows the general steps of one embodiment of the technique. Referring to FIG. 1, step 100 involves receiving a query that includes a particular operator, wherein the particular operator is one of MINUS and INTERSECT. Step 102 involves generating a set of one or more transformed queries that produce the same result as the original query but do not include that particular operator. Step 104 involves generating cost estimates for the transformed queries. Finally, step 106 involves selecting from the set of transformed queries a particular transformed query to execute based, at least in part, on the cost estimates.

Query Transformation

According to one embodiment, the database server constructs equivalent queries by transforming the set operations INTERSECT and MINUS contained in the original query into join/semi-join and anti-join, respectively. When the database server converts INTERSECT/MINUS into [semi]/anti-join, join methods such as hash, sort-merge, and nested loops may be employed to perform the join. In addition, new access paths and alternate join orders become possible. Converting the set operators into joins also provides scalability and parallelization.

Equijoin operations have been described above, with reference to tables R and S. The following sections illustrate anti-join and semi-join operations with reference to the same tables R and S.

Anti-Join

An antijoin operation returns all of the rows in a left-hand source that do not combine with any rows in a right-hand source. Thus, if tables R and S are combined in an anti-join where the join condition is R.b=S.b, then the result set would be:

| R.a | R.b |
|---|---|
| Y | B |

Anti-join does not remove duplicates from the left-hand source. Thus, if two rows of R contain (Y, B), then the result set would include both of the rows. Antijoins are described in detail in U.S. Pat. No. 6,449,606.

Semi-Join

A semi-join operation returns all of the rows in a left-hand source that satisfy the join condition relative to any rows in a right-hand source. Thus, if tables R and S are combined in a semi-join where the join condition is R.b=S.b, then the result set would be:

| R.a | R.b |
|---|---|
| W | A |
| X | A |
| Z | C |

In the result set, the row (Z, C) is only included once, even though (Z, C) satisfies the join condition relative to multiple rows ((2, C) and (3, C)) in the right-hand table. Thus, duplicates in the right-hand source do not affect the result of a semi-join. However, semi-join does not remove duplicates from the left-hand source. Thus, if two rows of R contained (W, A), then the result set would include both of the rows. Semi-joins are discussed in detail in U.S. Pat. No. 6,449,609.

Transformation Representations

For the purpose of explanation, textual examples of various transformed queries are provided. However, query transformations are not implemented at the textual level. For example, the text of a query may be used to generate an internal query structure, which serves as the internal representation of the query. Query transformations may be performed by transforming the internal query structure. Thus, while the textual representation of a transformed query may indicate the creation of a view, the actual execution of the transformed query need not involve the creation of an in-line view. Performing query transformations using internal representations of queries is described in detail in U.S. Pat. No. 5,963,932.

Transforming Queries Containing Intersect Operators

As mentioned above, database queries that contain the INTERSECT operator are transformed to produce several transformed queries, each of which produces the same result as the original query. For the purpose of explanation, it shall be assumed that a database server has received the following query (Q1):

| Q1. |
|---|
| SELECT T1.X<br>FROM T1<br>INTERSECT<br>SELECT T2.Y<br>FROM T2<br>WHERE T2.Z = 5; |

In query Q1, T1.X is the left-hand source for the INTERSECT operation and T2.Y is the right-hand source for the intersect operation. In the following sections, examples are given of how query Q1 may be transformed to produce equivalent queries. The transformations affect how the database server will produce the results of the command, but do not actually change the results thus produced.

Because MINUS and INTERSECT produce sets of unique values, the transformed queries typically involve duplicate elimination (represented by the DISTINCT operator). However, the transformed queries differ relative to where, within the transformed query or the query plan, the duplicate elimination is performed.

The optimal point at which to perform duplicate elimination may vary based on a variety of factors. For example, if duplicate elimination is performed on the result, then there would be no need to sort the input operands to the MINUS/INTERSECT operator in the query. The output of INTERSECT/MINUS will always be smaller than the sum of the inputs and will generally be smaller then either input. Therefore, doing delayed evaluation of the distinct operator (i.e., duplicate elimination) should generally be cheaper than doing duplicate elimination on the inputs. On the other hand, by performing early duplicate elimination, a significant reduction may result in the number of rows on which multiple distinct operators apply, as well as in the number of rows later used in the join. Therefore, placement of distinct operator varies among the various transformed queries. After the various transformed queries have been generated, the database server selects the transformation that has the lowest estimated cost.

Intersect—First Transformation Example

According to one embodiment, the database server transforms query Q1 to produce the following transformed query (Q1A):

| Q1A. |
|---|
| SELECT DISTINCT T1.X<br>FROM T1,T2<br>WHERE T2.Z = 5 and T1.X = T2.Y; |

Query Q1A achieves the results of Q1 using an equijoin. In Q1A, duplicate elimination is deferred by applying the DISTINCT operator to the output of the equijoin. Specifically, because the DISTINCT operator is applied to the values produced by the equijoin, the equijoin is performed prior to execution of the distinct operation.

The operations that a database server would perform when executing Q1A may be further illustrated using the rowsource or iterator model of SQL execution and the Parallel Execution model, which is described in detail in U.S. Pat. No. 5,956,704. Specifically, if the database server chooses to perform the equijoin using a hash join, the physical plan corresponding to Q1A could look like the following:

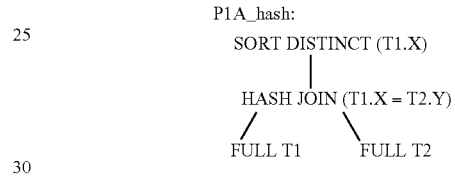

If this query plan is executed in parallel using a HASH-HASH distribution for the has-join, then the following parallelism is achieved during execution. One set of slave processes performs a full scan of table T1, while another set of slave processes performs a full table scan of T2. Both sets of table scan slaves redistribute their rows to a set of hash join slaves using hash-based distribution. Each hash-join slave performs the join based on the join condition. Moreover, since the join column T1.x is the same as the distinct column and the input redistribution into the join-slaves is based on HASH (T1.x) from the left side, all rows with the same value of T1.x will be sent to the same join slave, implying that the distinct computation can be performed on the same join slave without need for another redistribution. Duplicate elimination is then performed on the result of the join.

Intersect—Second Transformation Example

According to one embodiment, the database server transforms query Q1 to produce the following transformed query (Q1B):

| Q1B. |
|---|
| SELECT V1.X<br>   FROM (SELECT DISTINCT T1.x<br>FROM T1) V1, T2<br>WHERE T2.Z = 5 and V1.X S= T2.Y; |

Query Q1B achieves the results of Q1 using a semi-join between a view (V1) and the right-hand source (T2) of the INTERSECT operation of the original query Q1. The view represents the results of performing duplicate elimination (using the DISTINCT operator) to T1.X, the left-hand source of the INTERSECT operation specified in the original query Q1. The clause "V1.X S=T2.Y" is used to indicate a semi-join operation, in which V1.X is the left hand source and T2.Y is the right hand source.

If the database server chooses a hash join to perform the semi-join, then the physical plan corresponding to Q2B could look like the following:

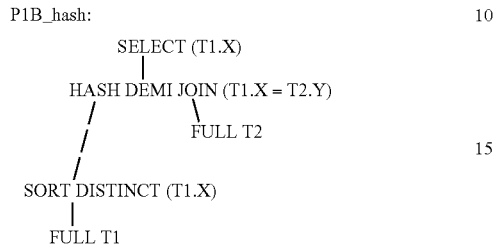

P1B_hash:

Unlike Q1A, Q1B specifies that the DISTINCT operation be performed before T1 is joined with T2. In situations in which the left-hand side of the INTERSECT operation includes many duplicate join values, performing the DISTINCT operation on the left-hand values (T1.X) before performing the join may significantly reduce the number left-hand rows that have to be processed during the join operation. The combination of performing a distinct operation on the left-hand source and using a semi-join ensures that all values in the result set of the join are distinct. Consequently, no separate distinct operation need be performed on the output of the semi-join operation.

Intersect—Third Transformation Example

According to one embodiment, the database server transforms query Q1 to produce the following transformed query (Q1C):

| Q1C. |
|---|
| SELECT DISTINCT T1.X<br>FROM (SELECT DISTINCT T2.y<br>FROM T2<br>WHERE T2.Z = 5) V2, T1<br>WHERE V2.Y = T1.X; |

Query Q1C achieves the result of Q1 using an equijoin between the left-hand source (T1.X) and a view (V2). The view represents the result of performing duplicate elimination (using the DISTINCT operator) on T2.Y, the right-hand source of the INTERSECT operation specified in the original query Q1.

If the database server chooses to perform the equijoin using a hash join, the physical plan corresponding to Q1C could look like the following:

P1C_hash:

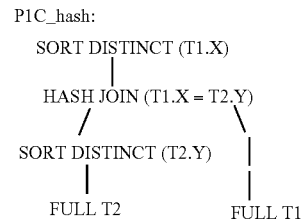

In this example, duplicate elimination is performed on the right-hand source prior to the join, and on the results of the join. Performing duplicate elimination on the results of the join is necessary because the combination of duplicate elimination on the right-hand source, and an equijoin, does not guarantee that the result set produced by the join will be unique.

Intersect—Fourth Transformation Example

According to one embodiment, the database server transforms query Q1 to produce the following transformed query (Q1C):

| Q1D. |
|---|
| SELECT V1.X<br>FROM (SELECT DISTINCT T1.x<br>FROM T1) V1,<br>(SELECT DISTINCT T2.y<br>FROM TZ<br>WHERE T2.Z = 5) V2<br>WHERE V2.Y = V1.X; |

If the database server chooses to perform the equijoin using a hash join, then the physical plan corresponding to Q1D could look like the following:

P1D_hash:

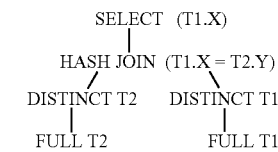

In this transformed query, duplicate elimination is performed on both inputs to the equijoin operation. Performing duplicate elimination on both inputs guarantees that the result set produced by the equijoin will not have any duplicates. Consequently, no duplicate elimination is performed on the result set produced by the equijoin.

Selecting Among the Equivalent Queries

As mentioned above, once the various transformed queries are generated, cost estimates are generated for each of the queries. The cost of a given query is based on a variety of factors, including how many duplicates are in each of the input sources. Once the cost estimates have been generated, the optimizer within the database server selects the transformed query with the lowest estimated cost. According to one embodiment, the original query Q1 is not considered as a possible candidate for selection, since one of the transformed queries is guaranteed to be equivalent, if not better, than the original. The execution plan of the transformed query thus selected is executed in response to requests to execute the original query.

Transforming Queries Containing Minus Operators

As mentioned above, database queries that contain the MINUS operator are transformed to produce several transformed queries, each of which produces the same result as the original query. For the purpose of explanation, it shall be assumed that a database server has received the following query (Q1):

| Q2. |
|---|
| SELECT T1.x<br>FROM T1<br>WHERE T1.z < 24<br>MINUS<br>SELECT T2.y<br>FROM T2, T3<br>WHERE T2.x = T3.x and T2.n < 6; |

In the following sections, examples are given of how query Q2 may be transformed to produce equivalent queries. Similar to the INTERSECT transformations described above, the MINUS transformations differ relative to where duplicate elimination is performed. However, the MINUS transformations differ from the INTERSECT transformations in that the MINUS transformations involve anti-join operations. The transformations affect how the database server will produce the results of the command, but do not actually change the results thus produced.

Minus—First Transformation Example

According to one embodiment, the database server transforms query Q2 to produce the following equivalent query (Q2A):

| Q2A. |
|---|
| SELECT DISTINCT T1.x<br>FROM T1,<br>  (SELECT T2.y<br>  FROM T2, T3<br>  WHERE T2.x = T3.x and T2.n < 6) V2<br>WHERE T1.z < 24 and T2.n < 6 and T1.x A= V2.y; |

Query Q2A achieves the results of Q2 using an anti-join between a view (V2) and the left-hand source (T1) of the MINUS of the original query Q2. The clause "T1.x A=V2.y" is used to indicate the anti-join operation, in which T1.x is the left hand source and V2.y is the right hand source. In query Q2A, duplicate elimination is deferred, and applied only to the results of the anti-join operation.

Minus—Second Transformation Example

According to one embodiment, the database server transforms query Q2 to produce the following equivalent query (Q2B):

| Q2B. |
|---|
| SELECT V1.x<br>FROM (SELECT DISTINCT T1.x<br>  FROM T1<br>  WHERE T1.z < 24) V1,<br>  (SELECT T2.y<br>  FROM T2, T3<br>  WHERE T2.x = T3.x and T2.n < 6) V2<br>WHERE V1.x A= V2.y; |

Query Q2B achieves the results of Q2 using an anti-join between two views (V1 and V2). The clause "V1.x A=V2.y" is used to indicate the anti-join operation, in which V1.x is the left hand source and V2.y is the right hand source. Duplicate elimination is performed on T1.x in V1. Duplicate elimination is not performed on T2.y. However, because duplicate elimination is performed on the left-hand source of the anti-join, the results of the anti-join are guaranteed to contain no duplicates.

Minus—Third Transformation Example

According to one embodiment, the database server transforms query Q2 to produce the following equivalent query (Q2C):

| Q2C. |
|---|
| SELECT DISTINCT T1.x<br>FROM T1,<br>  (SELECT DISTINCT T2.y<br>  FROM T2, T3<br>  WHERE T2.x = T3.x and T2.n < 6) V2<br>WHERE T1.z < 24 and T2.n < 6 and T1.x A= V2.y; |

Query Q2C achieves the results of Q2 using an anti-join between the left-hand source of the MINUS operation (T1.x) and a view (V2). The clause "T1.x A=V2.y" is used to indicate the anti-join operation, in which T1.x is the left hand source and V2.y is the right hand source. Duplicate elimination is performed on T2.y in V2. Duplicate elimination is also performed on the result set of the anti-join operation.

Minus—Fourth Transformation Example

According to one embodiment, the database server transforms query Q2 to produce the following equivalent query (Q2D):

| Q2D. |
|---|
| SELECT V1.x<br>FROM (SELECT DISTINCT T1.x<br>  FROM T1<br>  WHERE T1.z < 24) V1,<br>  (SELECT DISTINCT T2.y<br>  FROM T2, T3<br>  WHERE T2.x = T3.x and T2.n < 6) V2<br>WHERE V1.x A= V2.y; |

Query Q2D achieves the results of Q2 using an anti-join between the two views (V1) and (V2). The clause "V1.x A=V2.y" is used to indicate the anti-join operation, in which V1.x is the left hand source and V2.y is the right hand source.

Duplicate elimination is performed on T1.x in V1. Similarly, duplicate elimination is performed on T2.y in V2. Duplicate elimination need not be performed on the result set of the anti-join, since under these circumstances the result-set of the anti-join is guaranteed to be unique.

Queries that Contain Non-Uniform Set Operators

Queries that have more than one type of set operator within the same query block are said to have non-uniform set operators. An example of a query with a non-uniform set operation is illustrated below (Q3):

---
Q3.
---
SELECT T2.x
FROM T2
WHERE T2.y > 5
INTERSECT
(SELECT T1.x
FROM T1
UNION
SELECT SUM(z)
FROM T3
GROUP by T3.x)
MINUS
SELECT T4.Z
FROM T4
WHERE T4.K > 2;
---

Using the transformation techniques described above, query Q3 may be transformed in a variety of ways. Specifically, the portion of the query block that contains the INTERSECT operator may be transformed according to any of the INTERSECT transformations described above. Similarly, the portion of the query block that contains the MINUS operator may be transformed according to any of the MINUS transformations described above. One example of how query Q3 may be transformed is illustrated below (Q3A):

---
Q3A.
---
SELECT DISTINCT V2.X
FROM T4, (SELECT DISTINCT T2.X AS X
    FROM T2, (SELECT T1.x AS X
        FROM T1
        UNION
        SELECT SUM(z)
        FROM T3
        GROUP by T3.x) V1
    WHERE T2.y > 5 and T2.X = V1.X) V2
WHERE T4.K > 2 and V2.X A= T4.Z;
---

Hardware Overview

Figure 2:
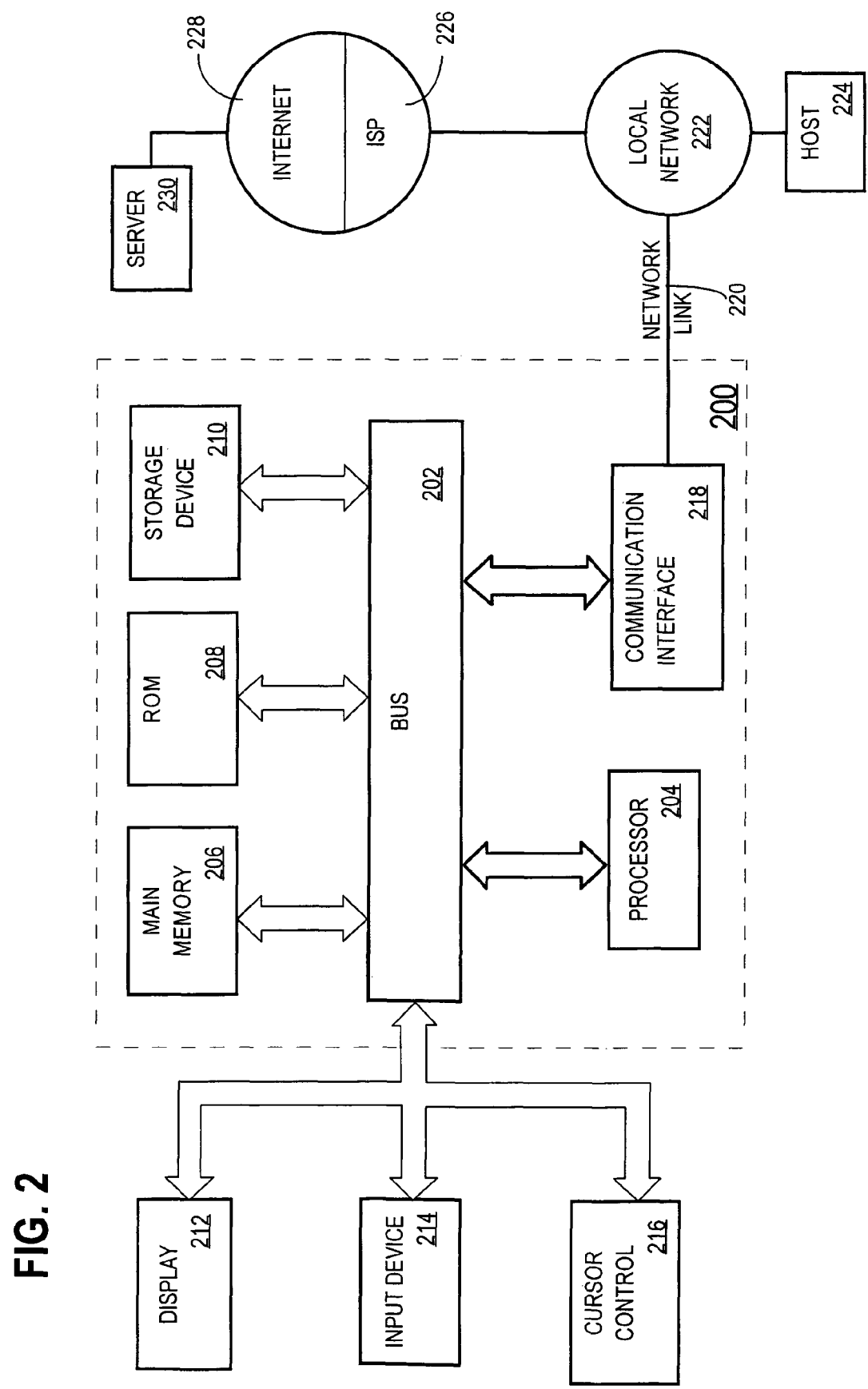
FIG. 2 is a block diagram of a computer system upon which embodiments of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to storage media, which includes non-volatile and volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of machine-readable media include, for example, storage media such as a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or transmission media such as a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine-executed method comprising the steps of:
receiving a particular query that includes a particular operator, wherein the particular operator is one of MINUS and INTERSECT;
generating a plurality of transformed queries, wherein each query of said plurality of transformed queries is generated by rewriting the particular query using a different combination of one or more transformations, and wherein each query of said plurality of transformed queries, if executed, produces a same result as said particular query but does not include said particular operator;
wherein each of the transformed queries comprises a different sequence of operators, and wherein at least one of the operators in each of the different sequences of operators eliminates duplicate values;
generating cost estimates for the transformed queries in said plurality of transformed queries;
comparing the cost estimate for one of the transformed queries to the cost estimate for another of the transformed queries; and
selecting from said plurality of transformed queries a particular transformed query to execute based, at least in part, on the cost estimates,
wherein each of said steps of said method is performed by one or more computing devices.

2. The method of claim 1 wherein:
the particular operator is INTERSECT; and
the step of generating a plurality of transformed queries includes generating a transformed query in which said particular operator is removed from said particular query, and in which said same result is produced with a semi-join operator.

3. The method of claim 1 wherein:
the particular operator is INTERSECT; and
the step of generating a plurality of transformed queries includes generating a transformed query in which said particular operator is removed from said particular query, and in which said same result is produced with an equi-join operator.

4. The method of claim 1 wherein:
the step of generating a plurality of transformed queries includes generating a first transformed query associated with a first execution plan and a second transformed query associated with a second execution plan; and
the first execution plan differs from the second execution plan relative to where duplicate elimination is performed.

5. The method of claim 1 wherein:
the particular operator is INTERSECT operator;
the particular query specifies a left-hand source and a right-hand source for said INTERSECT operator; and
the plurality of transformed queries includes a transformed query that is associated with an execution plan in which duplicate elimination is only performed after an equijoin operation between the left-hand source and the right-hand source.

6. The method of claim 1 wherein:
the particular operator is INTERSECT operator;
the particular query specifies a left-hand source and a right-hand source for said INTERSECT operator; and
the plurality of transformed queries includes a transformed query that is associated with an execution plan in which duplicate elimination is only performed on the left-hand source prior to a semi-join between the left-hand source and the right-hand source.

7. The method of claim 1 wherein:
the particular operator is INTERSECT operator;
the particular query specifies a left-hand source and a right-hand source for said INTERSECT operator; and
the plurality of transformed queries includes a transformed query that is associated with an execution plan in which duplicate elimination is performed on the right-hand source prior to an equijoin between the left-hand source and the right-hand source, and duplicate elimination is performed on a result set produced by the equijoin operation.

8. The method of claim 1 wherein:

the particular operator is the INTERSECT operator;

the particular query specifies a left-hand source and a right-hand source for said INTERSECT operator; and the plurality of transformed queries includes a transformed query that is associated with an execution plan in which duplicate elimination is performed on both the left-hand source and the right-hand source prior to an equijoin between the left-hand source and the right-hand source.

9. A machine-executed method comprising the steps of:

receiving a particular query that includes a MINUS operator;

generating a plurality of transformed queries, wherein each query of said plurality of transformed queries, if executed, produces a same result as said query but does not include said MINUS operator;

generating cost estimates for the transformed queries in said plurality of transformed queries;

selecting from said plurality of transformed queries a particular transformed query to execute based, at least in part, on the cost estimates;

wherein each of said steps of said method is performed by one or more computing devices; and wherein the step of generating a plurality of transformed queries includes generating a transformed query in which said particular operator is removed from said particular query, and in which said same result is produced with an anti-join operator.

10. The method of claim 9 wherein:

the particular query specifies a left-hand source and a right-hand source for said MINUS operator; and the plurality of transformed queries includes a transformed query that is associated with an execution plan in which duplicate elimination is performed only after an anti-join is performed between the left-hand source and the right-hand source.

11. The method of claim 9 wherein:

the particular query specifies a left-hand source and a right-hand source for said MINUS operator; and the plurality of transformed queries includes a transformed query that is associated with an execution plan in which duplicate elimination is performed on the left-hand source before an anti-join is performed between the left-hand source and the right-hand source.

12. The method of claim 9 wherein:

the particular query specifies a left-hand source and a right-hand source for said MINUS operator; and the plurality of transformed queries includes a transformed query that is associated with an execution plan in which duplicate elimination is performed on the right-hand source before an anti-join is performed between the left-hand source and the right-hand source, and duplicate elimination is performed on a result set produced by said anti-join.

13. The method of claim 9 wherein:

the particular query specifies a left-hand source and a right-hand source for said MINUS operator; and the plurality of transformed queries includes a transformed query that is associated with an execution plan in which duplicate elimination is performed on the right-hand source before an anti-join is performed between the left-hand source and the right-hand source, and duplicate elimination is performed on a the left-hand source before an anti-join is performed between the left-hand source and the right-hand source.

14. The method of claim 1 wherein the particular query contains non-uniform set operators.

15. A non-transitory machine-readable storage medium carrying one or more sequence of instructions which, when executed by one or more processors, causes the one or more processor to perform:

receiving a particular query that includes a particular operator, wherein the particular operator is one of MINUS and INTERSECT;

generating a plurality of transformed queries, wherein each query of said plurality of transformed queries is generated by rewriting the particular query using a different combination of one or more transformations, and wherein each query of said plurality of transformed queries, if executed, produces a same result as said particular query but does not include said particular operator;

wherein each of the transformed queries comprises a different sequence of operators, and wherein at least one of the operators in each of the different sequences of operators eliminates duplicate values;

generating cost estimates for the transformed queries in said plurality of transformed queries;

comparing the cost estimate for one of the transformed queries to the cost estimate for another of the transformed queries; and selecting from said plurality of transformed queries a particular transformed query to execute based, at least in part, on the cost estimates.

16. The machine-readable storage medium of claim 15, wherein:

the particular operator is INTERSECT; and the generating a plurality of transformed queries includes generating a transformed query in which said particular operator is removed from said particular query, and in which said same result is produced with a semi-join operator.

17. The machine-readable storage medium of claim 15, wherein:

the particular operator is INTERSECT; and the generating a plurality of transformed queries includes generating a transformed query in which said particular operator is removed from said particular query, and in which said same result is produced with an equi-join operator.

18. The machine-readable storage medium of claim 15, wherein:

the generating a plurality of transformed queries includes generating a first transformed query associated with a first execution plan and a second transformed query associated with a second execution plan; and the first execution plan differs from the second execution plan relative to where duplicate elimination is performed.

19. The machine-readable storage medium of claim 15, wherein:

the particular operator is INTERSECT operator;

the particular query specifies a left-hand source and a right-hand source for said INTERSECT operator; and the plurality of transformed queries includes a transformed query that is associated with an execution plan in which duplicate elimination is only performed after an equijoin operation between the left-hand source and the right-hand source.

20. The machine-readable storage medium of claim 15, wherein:
- the particular operator is INTERSECT operator;
- the particular query specifies a left-hand source and a right-hand source for said INTERSECT operator; and
- the plurality of transformed queries includes a transformed query that is associated with an execution plan in which duplicate elimination is only performed on the left-hand source prior to a semi-join between the left-hand source and the right-hand source.

21. The machine-readable storage medium of claim 15, wherein:
- the particular operator is INTERSECT operator;
- the particular query specifies a left-hand source and a right-hand source for said INTERSECT operator; and
- the plurality of transformed queries includes a transformed query that is associated with an execution plan in which duplicate elimination is performed on the right-hand source prior to an equijoin between the left-hand source and the right-hand source, and duplicate elimination is performed on a result set produced by the equijoin operation.

22. The machine-readable storage medium of claim 15, wherein:
- the particular operator is the INTERSECT operator;
- the particular query specifies a left-hand source and a right-hand source for said INTERSECT operator; and
- the plurality of transformed queries includes a transformed query that is associated with an execution plan in which duplicate elimination is performed on both the left-hand source and the right-hand source prior to an equijoin between the left-hand source and the right-hand source.

23. A non-transitory machine-readable storage medium carrying one or more sequences of instructions which, when executed by one or more processors, causes the one or more processors to perform:
- receiving a particular query that includes a MINUS operator;
- generating a plurality of transformed queries, wherein each query of said plurality of transformed queries, if executed, produces a same result as said particular query but does not include said MINUS operator;
- generating cost estimates for the transformed queries in said plurality of transformed queries;
- selecting from said plurality of transformed queries a particular transformed query to execute based, at least in part, on the cost estimates;
- wherein each of said steps of said method is performed by one or more computing devices; and
- wherein the step of generating a plurality of transformed queries includes generating a transformed query in which said particular operator is removed from said particular query, and in which said same result is produced with an anti-join operator.

24. The machine-readable storage medium of claim 23, wherein:
- the particular query specifies a left-hand source and a right-hand source for said MINUS operator; and
- the plurality of transformed queries includes a transformed query that is associated with an execution plan in which duplicate elimination is performed only after an anti-join is performed between the left-hand source and the right-hand source.

25. The machine-readable storage medium of claim 23, wherein:
- the particular query specifies a left-hand source and a right-hand source for said MINUS operator; and
- the plurality of transformed queries includes a transformed query that is associated with an execution plan in which duplicate elimination is performed on the left-hand source before an anti-join is performed between the left-hand source and the right-hand source.

26. The machine-readable storage medium of claim 23, wherein:
- the particular query specifies a left-hand source and a right-hand source for said MINUS operator; and
- the plurality of transformed queries includes a transformed query that is associated with an execution plan in which duplicate elimination is performed on the right-hand source before an anti-join is performed between the left-hand source and the right-hand source, and duplicate elimination is performed on a result set produced by said anti-join.

27. The machine-readable storage medium of claim 23, wherein:
- the particular query specifies a left-hand source and a right-hand source for said MINUS operator; and
- the plurality of transformed queries includes a transformed query that is associated with an execution plan in which duplicate elimination is performed on the right-hand source before an anti-join is performed between the left-hand source and the right-hand source, and duplicate elimination is performed on a the left-hand source before an anti-join is performed between the left-hand source and the right-hand source.

28. The machine-readable storage medium of claim 15, wherein:
- wherein the particular query contains non-uniform set operators.

29. A machine-executed method comprising the steps of:
- receiving a particular query that includes an INTERSECT operator;
- generating a plurality of transformed queries, wherein each query of said plurality of transformed queries, if executed, produces a same result as said particular query but does not include said INTERSECT operator;
- generating cost estimates for the transformed queries in said plurality of transformed queries;
- selecting from said plurality of transformed queries a particular transformed query to execute based, at least in part, on the cost estimates,
- wherein each of said steps of said method is performed by one or more computing devices;
- wherein the particular query specifies a left-hand source and a right-hand source for said INTERSECT operator; and
- wherein the plurality of transformed queries includes a transformed query that is associated with an execution plan in which duplicate elimination is performed; and
- wherein said performance of duplicate elimination includes one of the following:
    - performing duplicate elimination after an equijoin operation between the left-hand source and the right-hand source;
    - performing duplicate elimination on the left-hand source prior to a semi-join between the left-hand source and the right-hand source;
    - performing duplicate elimination on the right-hand source prior to an equijoin between the left-hand source and the right-hand source, and duplicate elimination is performed on a result set produced by the equijoin operation; and performing duplicate elimination on both the left-hand source and the right-hand source prior to an equijoin between the left-hand source and the right-hand source.

30. A non-transitory machine-readable storage medium carrying one or more sequences of instructions which, when executed by one or more processors, causes the one or more processors to perform:

receiving a query that includes an INTERSECT operator;

generating a plurality of transformed queries, wherein each query of said plurality of transformed queries, if executed, produces a same result as said particular query but does not include said INTERSECT operator;

generating cost estimates for the transformed queries in said plurality of transformed queries;

selecting from said plurality of transformed queries a particular transformed query to execute based, at least in part, on the cost estimates, wherein the particular query specifies a left-hand source and a right-hand source for said INTERSECT operator; and wherein the plurality of transformed queries includes a transformed query that is associated with an execution plan in which duplicate elimination is performed; and wherein said performance of duplicate elimination includes one of the following:

performing duplicate elimination after an equijoin operation between the left-hand source and the right-hand source;

performing duplicate elimination on the left-hand source prior to a semi-join between the left-hand source and the right-hand source;

performing duplicate elimination on the right-hand source prior to an equijoin between the left-hand source and the right-hand source, and duplicate elimination is performed on a result set produced by the equijoin operation; and performing duplicate elimination on both the left-hand source and the right-hand source prior to an equijoin between the left-hand source and the right-hand source.

\* \* \* \* \*